United States Patent

[11] 3,617,852

| [72] | Inventor | Lancelot Phoenix<br>Birmingham, England |
| --- | --- | --- |
| [21] | Appl. No. | 758,859 |
| [22] | Filed | Sept. 10, 1968 |
| [45] | Patented | Nov. 2, 1971 |
| [73] | Assignee | Joseph Lucas (Industries) Limited<br>Birmingham, England |
| [32] | Priority | Sept. 11, 1967 |
| [33] | | Great Britain |
| [31] | | 41299/67 |

[54] BATTERY CHARGING SYSTEM WITH A PERMANENT MAGNET ALTERNATOR AND MEANS FOR MINIMIZING NOISE
2 Claims, 1 Drawing Fig.

[52] U.S. Cl. .................................................... 320/61,
320/31, 320/39, 320/64, 321/18, 322/18, 322/28
[51] Int. Cl. ....................................................... H02j 7/14
[50] Field of Search ........................................... 320/DIG. 1,
DIG. 2, 31, 34, 37, 38, 39, 40, 61, 64, 68; 322/18,
19, 28; 321/5, 28, 47, 18; 323/225 CR; 307/152

[56] References Cited
UNITED STATES PATENTS

| 3,491,285 | 1/1970 | Nowakowski ................ | 322/28 |
| --- | --- | --- | --- |
| 3,315,141 | 4/1967 | Wright et al. ................. | 320/DIG. 2 UX |
| 3,343,059 | 9/1967 | Kirk et al. ..................... | 320/DIG. 2 UX |
| 3,427,528 | 2/1969 | Custer .......................... | 320/DIG. 2 UX |
| 3,427,529 | 2/1969 | Cummins et al. ............. | 320/DIG. 2 UX |
| 3,443,197 | 5/1969 | Rauer et al. ................... | 320/DIG. 2 UX |
| 3,454,861 | 7/1969 | Wright .......................... | 320/61 |

Primary Examiner—J. D. Miller
Assistant Examiner—John M. Gunther
Attorney—Holman & Stern ABSTRACT: In a battery charging system the battery is connected between a pair of supply lines and is charged by a permanent magnet alternator through a combined full-wave rectifier and regulating circuit, including thyristors which are controlled to control the supply from the alternator to the battery. A voltage regulator controls the gate currents of the thyristors, and there is further provided a control circuit connected across the supply lines and providing to the regulator an input signal which when the regulator changes state ensures that the regulator operates to change the gate current only after a delay.

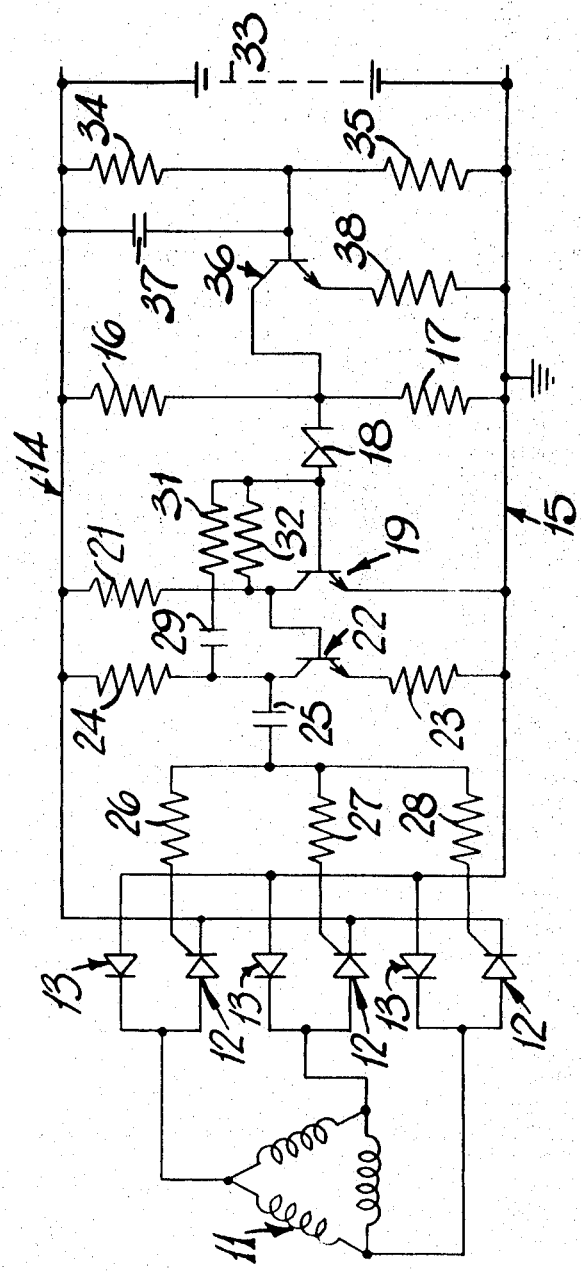

ively biased by the alternator output, at which point no
BATTERY CHARGING SYSTEM WITH A PERMANENT MAGNET ALTERNATOR AND MEANS FOR MINIMIZING NOISE This invention relates to battery charging systems, particular for use in road vehicles.

A system according to the invention comprises a pair of supply lines between which in use the battery is connected, a permanent magnet alternator supplying power to the supply lines through a rectifying and regulating circuit which incorporates thyristors conduction of which determines whether an output is fed to the supply lines, a voltage regulator which is controlled by an input signal derived from the supply lines and has one state in which it supplies gate current to each thyristor and a second state in which no gate current is supplied to the thyristors, and a control circuit connected across the supply lines and providing to the regulator a second input signal which when the regulator changes state overcomes the first signal initially so that the regulator reacts to changes in the first input signal only after a delay.

The purpose of the control circuit will become apparent from the example of the invention now to be described with reference to the accompanying circuit diagram.

Referring to the drawing, the battery charging system is intended for use in a road vehicle and includes a three-phase delta-connected permanent magnet alternator 11 the phase points of which are connected to the anodes of three thyristors 12, and to the cathodes of three diodes 13. The cathodes of the thyristors 12 are connected to a positive supply line 14, whilst the anodes of the diodes 13 are connected to a negative supply line 15, which may, as shown, be earthed.

Connected across the lines 14, 15 are a pair of resistors 16, 17 in series, the junction of the resistors 16, 17 being connected to a Zener diode 18 to the base of an NPN transistor 19 having its emitter connected to the line 15. The collector of the transistor 19 is connected to the line 14 through a resistor 21, and is further connected to the base of a second NPN transistor 22, the emitter of which is connected to the line 15 through a resistor 23, and the collector of which is connected to the line 14 through a resistor 24. The collector of the transistor 22 is also connected to one side of a capacitor 25, the other side of which is connected through resistors 26, 27, 28 respectively to the gates of the thyristors 12, and the collector of the transistor 22 is further connected to the base of the transistor 19 through a capacitor 29 and a resistor 31 in series. A further resistor 32 is connected between the collector and base of the transistor 19. The battery to be charged by the alternator 11 is connected across the lines 14,15 and is shown at 33.

The system further includes a control circuit having a pair of resistors 34,35 connected in series between the lines 14, 15, the junction of the resistors, 34, 35 being connected to the base of an NPN transistor 36, and being further connected through a capacitor 37 to the line 14. The transistor 36 has its emitter connected to the line 15 through a resistor 38, and its collector connected to the junction of the resistors 16, 17.

Assuming for the moment that the control circuit is not provided, the operation of the system is as follows. The transistors 19, 22 and their associated components constitute an oscillator which operates at a frequency considerably in excess of the frequency of the alternator 11. The capacitor 29 and resistor 31 provide the required feedback within the oscillator, whilst the resistor 32 ensures that the circuit is in the appropriate condition for oscillation. So long as the voltage between the lines 14, 15 is below a predetermined value, the Zener diode 18 does not conduct, and the oscillator operates to provide pulses to the gates of the thyristors 12 through the capacitor 25 and the resistors 26, 27, 28. Because the oscillator operates at a much higher frequency than the alternator, the thyristors 12 conduct whenever they are positively biased by the alternator output, and so they effectively become diodes and fullwave rectifier supplies power to the lines 14, 15. However, as soon as the voltage between the lines 14, 15 reaches a predetermined value, the Zener diode 18 conducts and provides additional base current to the transistor 19, thereby saturating the transistor 19 and stopping operation of the oscillator. No further pulses are now supplied to the gates of the thyristors 12, and any thyristor which is conducting when the Zener diode 18 conducts will continue to conduct only until it is reverse biased by the alternator output, at which point no further power will be supplied to the lines 14, 15. The voltage between the lines 14, 15 will now fall, and a point will be reached at which the Zener diode 18 becomes nonconductive again, whereupon the oscillator will start to operate again and power will be supplied to the lines 14, 15.

It is found in practice that a system of this sort causes the alternator to be noisy. The reason for this is that the regulator operates at the ripple frequency between the lines 14, 15 for a large part of its operating range, and this causes the stator flux to be modulated at a frequency which is some multiple of alternator frequency, (six times in the case of a three-phase machine). This results in a noise frequency band, over the normal machine speed range, which is objectionable to the ear. In addition, the machine resonance is normally within the frequency band and this causes peaks in the noise spectrum. The purpose the control system is to overcome this problem.

The voltage regulator receives a first input as previously explained from the junction of the resistors 16, 17, but it also receives a second input from the collector of the transistor 36. The second input is, by virtue of the transistor 36, in opposition to the first input, so that if the voltage between the supply lines 14, 15 is increasing or decreasing, the first input will also be increasing or decreasing but the second input will be decreasing or increasing. The effect of this is best seen by considering a situation in which the Zener diode 18 is conducting so that the voltage between the lines 14, 15 is decreasing. At a predetermined voltage, the Zener diode 18 will cease to conduct, and the voltage between the lines 14, 15 will start to increase again. Without the control circuit, the ripple would turn the Zener diode 18 on again, but by virtue of the control circuit, the increasing voltage between the lines 14, 15 results in a second input signal which is decreasing, the values being so chosen that the second input signal is greater than the first input signal, so that the Zener diode 18 is held off. Without the capacitor 37, the Zener diode 18 would never turn on again, but by virtue of the capacitor 37, rise in voltage between the lines 14, 15 cannot cause the second input signal to decrease at the same rate as the first input signal increases, and so eventually a stage is reached at which the Zener diode 18 does conduct again, so that the gate current is removed and the voltage between the lines 14, 15 starts to fall. Once again, the absence of the control circuit would result in further switching by virtue of the ripple, but when the Zener diode 18 is turned on, the decreasing first input signal to the voltage regulator is more than counteracted by the increasing second input signal, so that the Zener diode 18 is held on for a predetermined period of time again determined by the capacitor 37. It is found that by causing the circuit to operate in this way, the noise previously mentioned is substantially reduced.

It will be appreciated that the control circuit only fixes the minimum time for which the regulator can be on or, off, and does not operate the circuit with equal mark-space ratios, unless the requirement for a particular set of conditions is for 50 percent of full load. At other load requirements, the on and off times will depend on how much the battery voltage is depressed when the control circuit holds the voltage regulator off, and how much the battery voltage rises when the control circuit holds the voltage regulator on.

The invention can also be applied to systems in which instead of using thyristors as part of the fullwave rectifier, a fullwave rectifier using diodes is employed and the thyristors short circuit one set of diodes when the thyristors conduct. In this case, the thyristors are required to be off for an output to be produced, rather than on as in the example described, and so the voltage regulator shown would require to be modified so that it produces an output when the Zener diode 18 is conducting.

Having thus described my invention what I claim as new and desire to secure by Letters Patent is:

1. A battery charging system comprising a pair of supply lines between which in use the battery is connected, a permanent magnet alternator supplying power to the supply lines through a rectifying and regulating circuit which incorporates thyristors conduction of which determines whether an output is fed to the supply lines, a voltage regulator which is controlled by an input signal derived from the supply lines and has one state in which it supplies gate current to each thyristor and a second state in which no gate current is supplied to the thyristors, said voltage regulator inherently affecting stator flux modulation of said permanent magnet alternator whereby a noise frequency band results, and a control circuit means connected across the supply lines and providing to the regulator a second input signal which when the regulator changes state overcomes the first signal initially so that the regulator reacts to changes in the first input signal only after a delay, said control circuit means suppressing said noise frequency.

2. A system as claimed in claim 1 in which the thyristors form part of the rectifying circuit so that when gate current is supplied to the thyristors the voltage across the supply lines increases and when no gate current is supplied the voltage across the supply lines decreases.

* * * * *